Jan. 8, 1963 M. J. KENNIS 3,072,331

APPARATUS FOR PROCESSING DECIMAL NUMBERS

Filed July 7, 1960 2 Sheets-Sheet 1

INVENTOR

MATHEUS J. KENNIS

INVENTOR
MATHEUS J. KENNIS

United States Patent Office 3,072,331

Patented Jan. 8, 1963

3,072,331

APPARATUS FOR PROCESSING DECIMAL NUMBERS

Matheus J. Kennis, Haarlem, Netherlands, assignor to Blikman & Sartorius N.V., Amsterdam, Netherlands Filed July 7, 1960, Ser. No. 41,383

15 Claims. (Cl. 235—146)

The invention relates to apparatus for processing numbers appearing in a register, and more in particular to a system whereby such numbers are automatically processed with the aid of an adding machine.

There are many cases in which it is desired to print numbers appearing in a register, or to subject such numbers to arithmetical operations. In general, the apparatus required for this purpose is very complicated.

It is an object of the invention to provide an apparatus by means of which numbers appearing in a register may be processed, i.e. printed or subjected to arithmetical operations, in a simple manner.

Another object of the invention is to provide means whereby numbers appearing in a register may be automatically entered in an adding machine of the ten keys type in order to print the numbers, or to subject them to arithmetical operations.

A further object of the invention is to provide means whereby the digit keys and at least one function key of an adding machine of the ten keys type may be automatically operated in accordance with data appearing in a register.

Still another object of the invention is to provide means whereby a number entered by hand in an adding machine of the ten keys type may be automatically added to, or subtracted from a number appearing in a register.

According to a main feature of the present invention, an operating electromagnet is arranged opposite to each of the digit keys and to at least one of the function keys of an adding machine of the ten keys type so as to operate the associated key when energized, and at least the magnets associated with the digit keys are energized through the register by successively sensing the digit positions of the register through conductors energized by a sensing contact attached to the pin carriage of the adding machine.

Further objects and characteristics of the invention will become apparent from the following description, given with reference to the accompanying drawings.

Figure 2:
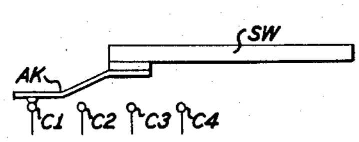
FIG. 2 shows a schematic cross section of the sensing contact attached to the pin carriage.

In the system according to the invention, numbers appearing in a register are processed by means of a conventional adding machine of the ten keys type. Such adding machines are generally known, so that a detailed description is superfluous. They comprise a pin carriage which contains a matrix of displaceable pins or similar displaceable members; the number of columns of this matrix corresponds with the number of digits which may be successively entered, and each column consists of nine or ten pins, corresponding with the digit values from 1 to 9, or from 0 to 9, respectively. When a digit is entered by depression of a digit key, a pin having the corresponding digit value is depressed, and the carriage makes a step, so that a pin in the next column is depressed when the next digit is entered. After all the digits of a number have been entered, a function key is depressed, whereby the machine makes a working cycle. During this cycle, a plurality of toothed racks, each associated with one of the columns of said matrix, are moved forward until they abut against the depressed pins, whereby associated type bars are adjusted to the digit values registered in the various columns, so as to print the entered number; during the return movement of the racks, they may be coupled with the wheels of a counter, so that the number is entered in the same. After a plurality of numbers have been entered, the sum of these numbers may be obtained by depressing a total key, which initiates a working cycle wherein the racks are coupled with the counter wheels during their forward movement, so that the type bars are adjusted to the sum appearing in the counter. The key board comprises ten digit keys, each for one of the digits from 0 to 9, and a plurality of function keys. The most important function keys are a "plus" key for entering a number with the positive sign, a "minus" key for entering a number with the negative sign, a "non-add" key for printing a number without entering the same in the counter, a "sub-total" key for printing the sum appearing in the counter, and re-entering the same in the counter, and a "total" key for printing the sum appearing in the counter without re-entering the same in the counter. Additional keys may be provided for simultaneously entering two or three noughts, for repeating the entering of a number for multiplication purposes, and so on.

In the system according to the invention, the digit keys and at least one function key of the adding machine are operated by means of electromagnets energized through the register.

For this purpose, the positions of the register are successively sensed by means of a sensing contact attached to the pin carriage of the adding machine. When a key has been depressed by excitation of the associated operating magnet, this excitation must again be interrupted in order to release the key. In the commercially available adding machines of the ten keys type, the pin carriage generally makes a first half step upon depression of a digit key, and a second half step upon release of the depressed key. The ratio of the two half steps is different for each type of machine. If the machine is suitably constructed, i.e. if the first half step is large enough, the diameter of the fixed contacts cooperating with the sensing contact may be chosen in such manner that the connection with the register is interrupted by the first half step. In this case, no additional means are required to interrupt the excitation of the operating magnet. It is only necessary to interrupt the excitation of the sensing contact upon operation of the function key, in order to prevent a repetition of the sensing process.

If the first half step of the pin carriage is too small to provide for an auotmatic interruption of the excitation of the operating magnet, an interrupting relay may be provided in the common return lead of the operating magnets of the digit keys, so as to interrupt the feed circuit of the sensing contact upon excitation of an operating magnet.

Figure 1:
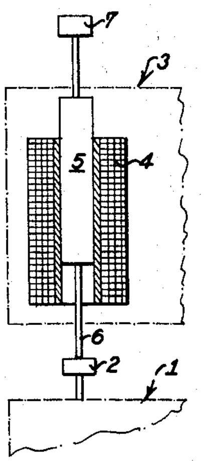
FIG. 1 shows a longitudinal section of an operating magnet.

Referring now to FIG. 1, the adding machine has been schematically shown at 1; a key 2 extends from the housing of the adding machine. An operating box 3 is arranged above the key board of the adding machine 1, and is supported thereby in any suitable manner (not shown). The operating box contains an operating magnet for each of the digit keys of the adding machine, and for at least one of its function keys. Each operating magnet comprises a coil 4, and a core 5 which is drawn into the coil when the same is energized, so as to actuate the key 2 by means of the rod 6. In order that the keys of the adding machine may also be operated by hand, auxiliary keys 7 may be provided on each of the cores 5. These auxiliary keys extend beyond the housing of the operating box, so that they may be depressed to actuate the keys of the adding machine through the intermediary of the associated core.

Figure 3:
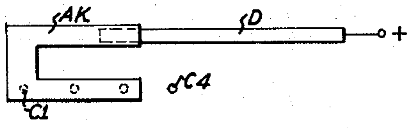
FIG. 3 shows a plan view of the sensing contact.

In FIG. 2, the pin carriage of the adding machine is schematically shown at SW. A U-shaped sensing contact AK, slightly bent in a downward direction, is attached to the pin carriage in such manner as to be electrically insulated therefrom and passes with one of its legs over a series of fixed contacts C1, C2, C3, C4, and so on, spaced at distances corresponding with one step of the carriage. As appears from FIG. 3, the other leg of the sensing contact AK passes over a continuous feed bar D, so that the said fixed contacts are successively connected with the feed bar during the step-wise movement of the carriage.

Figure 4:
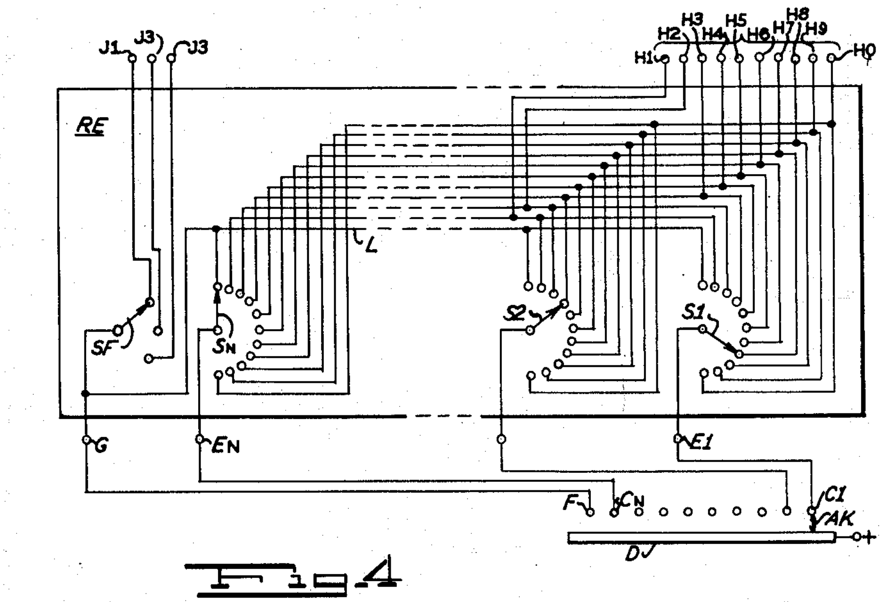
FIG. 4 shows the circuit diagram of a preferred embodiment of the register.

The register shown in FIG. 4 comprises for each digit position a rotatable switch S1, S2, . . . S*n*, of which the switch arm is connected with an associated input terminal E1, E2, . . . E*n*. In addition, the register comprises a rotatable switch SF for the selection of the desired function; the switch arm of this switch is connected with an input terminal G. The fixed contacts cooperating with the sensing contact comprise the digit contacts C1, C2, . . . C*n*, each connected with one of the input terminals E1–E*n*, and a function contact F, connected with input terminal G.

The digit switches S1–S*n* are each provided with a rest contact, connected with the line L, and with ten contacts each corresponding with a digit value and connected with an appropriate output terminal H1–H0. The function switch SF has three contacts, which may represent, for instance, the functions "plus," "minus" and "non-add," and are connected with the output terminals J1–J3. In the drawing, switches S1 and S2 are adjusted to the digit values 7 and 3, respectively, and switch S*n* is in its rest position. Switch SF is in its first position, which may represent the function "plus." The operating magnets of the digits keys are each connected with one of the output terminals H1–H0, and the operating magnets of the function keys each with one of the output terminals J1–J3. Line L is connected with input terminal G.

In the position as shown in FIGURE 4, the sensing contact AK is on the first fixed contact C1, so that the first position of the register is sensed. As switch S1 is adjusted to the value 7, key 7 of the adding machine is operated through output terminal H7. As soon as this digit has been entered, the carriage makes one step, so that the sensing contact reaches fixed contact C2, and key 3 of the adding machine is operated through switch S2 and output terminal H3. When the sensing contact reaches a fixed contact of the group C1–C*n* which is connected with a switch in its rest position, the desired function key is operated through switch SF, so that the number entered in the adding machine is printed, and entered in the counter, if desired. The carriage returns to its rest position. If all the digit switches S1–S*n* are adjusted to a digit, the function key is operated when the sensing contact reaches contact F.

The number in register RE is always registered in such manner that the digit of the highest order appears in the first digit position (switch S1). Due to the connection of line L with terminal G, the function key is operated immediately after the last digit if the number has been read out of the register.

Switches S1–S*n* and SF may be adjusted in any desired manner, either by hand or automatically. When the apparatus is used for processing measuring results, the switches may be adjusted by the measuring apparatus. For instance, the apparatus according to the invention may be used to record weights, and in this case the switches are set by the weighing apparatus.

If desired, the switches may be replaced by combinations of relay contacts, vacuum tubes or transistors. The only essential property of the register is that an output terminal corresponding to a registered digit or function is excited upon excitation of an input terminal corresponding to a certain position.

Figure 5:
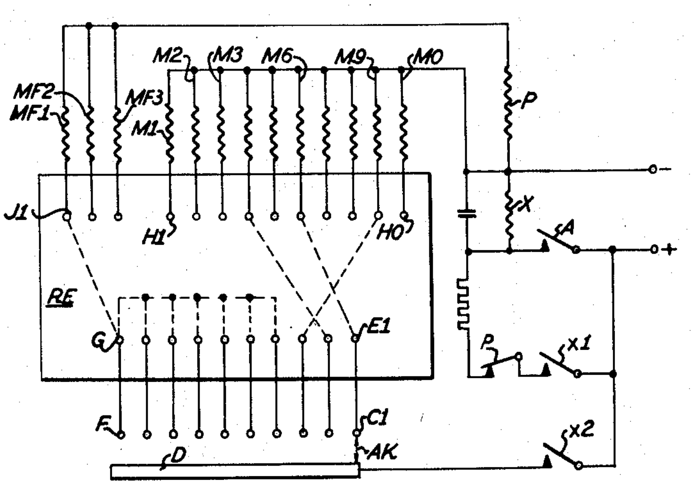
FIG. 5 shows the circuit diagram of a system according to the invention, wherein the excitation of the operating magnets of the digit keys is automatically interrupted.

In the apparatus shown in FIG. 5, each of the output terminals H1–H0 of the register RE is connected with the negative terminal "−" of the voltage source through an associated operating magnet M1–M0 for one of the digit keys of the adding machine. The output terminals J1–J3 are each connected with a common return lead through an associated operating magnet MF1–MF3 for one of the function keys; the said return lead is connected with the negative terminal of the voltage source through a relay P. A control relay X is connected to the voltage source in series with a starting switch A, and is provided with a holding contact *x*1. The feed bar D of the sensing contact is connected with the positive terminal "+" of the voltage source through a make contact *x*2 of relay X. A break contact *p* of relay P is inserted in the holding circuit of relay X. A de-energizing delay for relay X has been obtained by means of a shunt condenser.

As schematically indicated by dotted lines, it is assumed, by way of example, that the number 649 and the function "plus" have been registered. As the number has only three positions, the fourth input terminal of the register is connected with terminal G through line L.

The operation of the apparatus is as follows. Upon operation of the starting switch A (either by hand or automatically, according to circumstances), relay X is energized and held through contact *x*1. Through contact *x*2, the feed bar D is connected with the voltage source, so that operating magnet M6 is energized through AK, C1, E1, S1, H6. As soon as key "6" of the adding machine is depressed, the carriage makes its first half step, whereby sensing contact AK is removed from fixed contact C1, so that the energizing circuit of magnet M6 is interrupted. The key is thereby released, so that the carriage makes its second half step, and sensing contact AK reaches contact C2. The same cycle is repeated until sensing contact AK reaches contact C4. Now, function magnet FM1 and relay P are energized through C4, E4, S4, L, G, SF. Contact *p* is opened, so that relay X is slowly de-energized. Due to the de-energizing delay of relay X, magnet MF1 remains energized during a sufficient time to ascertain the operation of the function key. Contact *x*2 interrupts the energizing circuit of the function magnet and of relay P. The apparatus has now returned to its initial condition.

Figure 6:
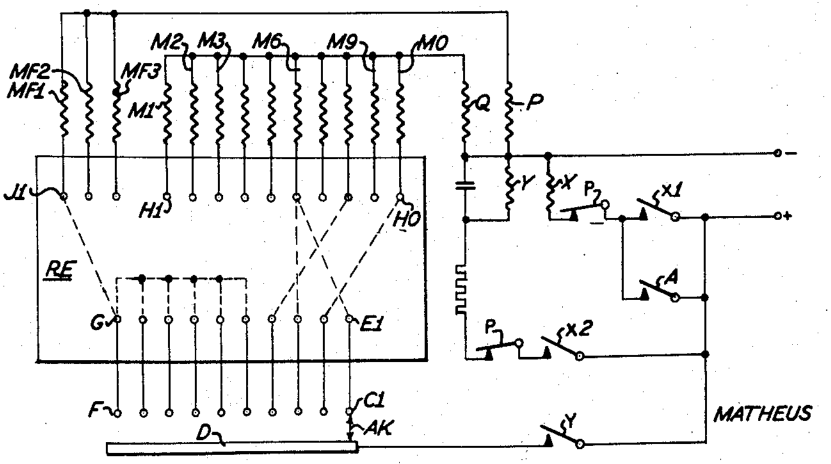
FIG. 6 shows the circuit diagram of a system according to the invention wherein the excitation of the operating magnets of the digit keys is interrupted by a special interrupting relay.

The apparatus shown in FIG. 6 is based on the assumption that the first half step of the pin carriage is too small to interrupt the excitation of the operating magnets of the digit keys. For this purpose, an interrupting relay Q has been provided in the common return lead of the operating magnets M1–M0. In addition, a second control relay Y has been provided, which is energized through a make contact *x*2 of relay X and a break contact *q* of relay Q. The feed bar D is fed through a make contact *y* of relay Y. Relay X is de-energized without delay; relay Y has a de-energizing delay due to a shunt condenser. As schematically indicated by doted lines, it is assumed that the number 6068 and the function "plus" are registered.

The operation is as follows. Upon operation of starting switch A, relay X is energized and held through contact *x*1. Relay Y is energized through contact *x*2, so that feed bar D is connected with the voltage source through contact *y*. Simultaneously with the operating magnet (M6), relay Q is energized, so that contact *q* interrupts the energizing circuit of relay Y, which is de-energized with a certain delay. This delay has been selected in such manner that the digit keys of the adding machine are operated with certainty. As soon as relay Y is de-energized, the depressed key is released, so that sensing contact AK reaches the next fixed contact, and the cycle is repeated. Relay P is energized simultaneously with the function magnet (MF1), and interrupts the holding circuit of relay X at contact *p*. Contact *x*2 interrupts the circuit of relay Y, which is de-energized with a certain delay. The apparatus has now returned to its initial condition.

Figure 7:
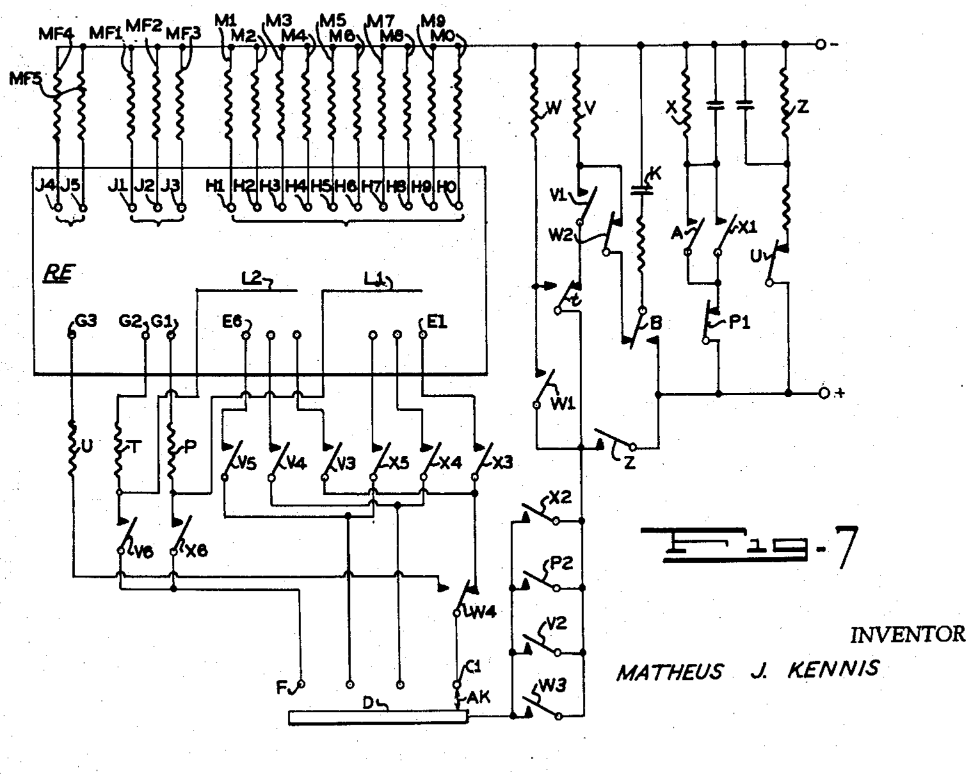
FIG. 7 shows the circuit diagram of a system according to the invention by means of which two numbers simultaneously appearing in the register may be added together, or a number entered by hand may be added to a number appearing in the register.

FIG. 7 shows an apparatus by means of which two numbers registered in register RE may be automatically added together. For this purpose, the register is divided in two groups, each for one of the said numbers and for the associated function. In the embodiment as shown, the first group comprises three digit positions, connected with input terminals E1–E3, and a function position, connected with input terminal G1. The second group comprises three digit positions, connected with input terminals E4–E6, and a function position connected with input terminal G2. The digit positions of both groups cooperate with output terminals H1–H0, the function positions with output terminals J1–J3. The line L has also been divided in two parts, indicated at L1 and L2, and connected with terminals G1 and G2, respectively. In addition, the register comprises a third function position, connected with an input terminal G3, and cooperating with output terminals J4 and J5. This additional function position serves to indicate the desired adding function (total or sub-total); the output terminals are connected with the operating magnets MF4 and MF5 for the adding keys.

There are provided two switch-over relays V and W. Relay V serves for switching over from the first to the second number, and relay W for switching over to the adding function.

Sensing contact AK passes over three digit contacts C1–C3 and one function contact F. Contacts C1–C3 may be connected through make contacts *x*3–*x*5 of relay X with input terminals E1–E3, and through make contacts *v*3–*v*5 of relay V with input terminals E4–E6 of the register. Contact F may be connected either with terminal G1 through contact *x*6 and relay P, or with terminal G2 through contact *v*6 and relay T. Finally, contact C1 may be connected through contact *w*4 of relay W with terminal G3. This connection includes an interrupting relay U.

Relay X operates in the same manner as in the apparatus shown in FIG. 5. It is assumed that the first half step of the pin carriage suffices to interrupt the excitation of the operating magnets of the digit keys, in the same manner as in the apparatus according to FIG. 5.

A relay Z, connected in series with a break contact *u* of relay U, serves to interrupt the feed circuit of the sensing contact and to return the apparatus to its initial condition after operation of the adding key.

The adding machine comprises an additional switch-over contact B, which is actuated by the pin carriage in such manner as to occupy one position when the carriage is in its rest position, and a second position when the carriage is away from its rest position. In its first-mentioned position, contact B connects a condenser K with relay V; in its other position, it connects said condenser with the positive terminal of the voltage source. The connection of contact B with relay V includes a break contact *w*2 of relay W.

The operation is as follows:

As long as the apparatus is connected with the voltage source, relay Z is energized, so that contact *z* is closed. Upon operation of the starting switch A, relay X is energized and held through contact *x*1. Through contact *x*2, the feed bar D is connected with the voltage source. Contacts *x*3–*x*6 connect contacts C1–C3 with input terminals E1–E3, and contact F with relay P. The first number is now read out in exactly the same manner as in the apparatus shown in FIG. 5.

As soon as the carriage leaves its rest position (i.e. when the first digit is read out), contact B connects condenser K with the voltage source, so that the condenser is charged.

When sensing contact AK reaches contact F (or a contact of group C1–C3 connected with line L1), relay P is energized together with one of the function magnets MF1–MF3. Contact *p*1 interrupts the holding circuit of relay X, so that contacts *x*1–*x*6 are opened. The carriage returns to its rest position.

As soon as the carriage reaches its rest position, relay V is energized through contact B by the charge of condenser K. Relay V is held through contact *v*1. Through contact *v*2, the feed bar is again connected with the voltage source; contacts *v*3–*v*6 connect contacts C1–C3 with terminals E4–E6, and contact F with relay T. The second number is read out. As soon as sensing contact AK reaches contact F (or a contact of group C1–C3 connected with line L2), relay T is energized together with one of the operating magnets MF1–MF3. Contact *t* interrupts the holding circuit of relay V, and energized relay W, which is held through contact *w*1. Contact *w*2 interrupts the circuit of relay V. Contact *w*3 maintains the connection of bar D with the voltage source, so that the function key is depressed with certainty. The carriage returns to its rest position.

As soon as the carriage reaches its rest position, relay U is energized through contacts C1 and *w*4, together with one of the function magnets MF4 and MF5. Contact *u* interrupts the circuit of relay Z, which is de-energized with a certain delay. Contact *z* interrupts the circuits of relays U and W, and of the function magnet, whereby the apparatus is returned to its initial condition. The de-energizing delay of relay Z has been chosen in such manner that the adding key is operated with certainty.

Although three positions are provided in the register for each number in the embodiment as shown, it will be understood that the number of positions for each number may be increased as desired, provided that the number of contacts of relays X and V, and the number of fixed contacts C1–C*n* are increased to the same extent; under circumstances, this may involve a duplication of relays X and V.

Instead of reading the first number out of the register, it is also possible to enter the same by hand (i.e. by means of the auxiliary keys 7 shown in FIG. 1). In this case, relays X and P are left out of operation. When the first number has been entered, the carriage returns to its rest position, so that relay V is energized. The second number is now read out of the register and added to the first number in the above-described manner. Of course, if the apparatus need only be operated in this way (i.e. by entering the first number by hand), relays X and P, and the register positions provided for the first number may be omitted.

Although the invention has been described hereinbefore by reference to some specific embodiments thereof, it is to be understood that these embodiments may be modified and altered in various ways within the scope of the invention as set forth in the claims.

I claim:

1. In combination, a register comprising a plurality of input terminals each representing a digit position, a plurality of output terminals each representing a digit value, and switching means for connecting each of the said input terminals with one of the said output terminals in accordance with a registered number, an adding machine of the ten keys type, comprising a plurality of digit keys, a plurality of function keys, a pin carriage, means operated by the said digit keys for displacing said pin carriage step by step as a sequence of digits are entered by means of said digit keys, a sensing contact attached to said pin carriage, means for supplying a voltage to said sensing contact, and a plurality of fixed contacts successively engaged by said sensing contact during the stepwise movement of said pin carriage, a plurality of conductors each connecting one of the said fixed contacts with one of the said input terminals, and a plurality of operating electromagnets each adapted to be energized through one of the said output terminals and each arranged in operative association with one of the said digit keys so as to operate the same when energized.

2. The combination as claimed in claim 1, wherein said register further comprises at least one additional input terminal representing a function position, a plurality of additional output terminals each representing a function, and switching means for connecting said additional input terminal with one of the said additional output terminals in accordance with a registered function, said combination further comprising a plurality of additional operating magnets each adapted to be energized through one of the said additional output terminals and each arranged in operative association with one of the said function keys so as to operate the same when energized, and an additional conductor connecting one of the said fixed contacts with said additional input terminal.

3. The combination as claimed in claim 1, wherein the diameter of the said fixed contacts is such that the connection between said sensing contact and said register is interrupted by the first half step of said pin carriage upon depression of one of the said digit keys.

4. The combination as claimed in claim 1, further comprising a common return lead for the said operating magnets of the digit keys, and an interrupting relay inserted in said common lead and adapted to interrupt the connection between said sensing contact and said voltage source.

5. The combination as claimed in claim 1, wherein a first and a second number may be successively entered in said adding machine, said second number being registered in said register, further comprising a first switch-over relay adapted to connect the said fixed contacts with those of the said input terminals corresponding with the digits of said second number, means operative after said first number has been entered for energizing said first switch-over relay, a second switch-over relay adapted to energize one of the said additional operating magnets associated with an adding key of said adding machine, and means operative after said second number has been entered for energizing said second switch-over relay.

6. The combination as claimed in claim 1, further comprising a continuous feed bar adjacent said fixed contacts, and means for connecting said feed bar with said voltage source, wherein said sensing contact is U-shaped and arranged in such manner that one of its legs passes over said fixed contacts and the other leg over said feed bar.

7. The combination as claimed in claim 2, wherein the said switching means for each digit position connects the associated input terminal with said additional input terminal when no digit has been registered in the position in question.

8. The combination as claimed in claim 3, further comprising a starting switch, a control relay adapted to be energized through said starting switch and having a holding contact shunting said starting switch and a make contact connecting said sensing contact with said voltage source, and an interrupting contact inserted in series with said holding contact and adapted to be actuated upon operating of one of the said function keys.

9. The combination as claimed in claim 3, further comprising a common return lead for the operating magnets of a plurality of function keys, and an interrupting relay inserted in said common lead for operating said interrupting contact.

10. The combination as claimed in claim 4, further comprising a starting switch, a first control relay adapted to be energized through said starting switch and having a holding contact shunting said starting switch and a make contact, a second control relay adapted to be energized through said make contact and a break contact of said interrupting relay, and an interrupting contact in series with said holding contact and adapted to be actuated upon operation of one of the said function keys.

11. The combination as claimed in claim 4, further comprising a common return lead for the operating magnets of a plurality of function keys, and a second interrupting relay inserted in said common return lead and operating said interrupting contact.

12. The combination as claimed in claim 5, further comprising a condenser, a switch-over contact controlled by said pin carriage and connecting said condenser with said first switch-over relay when said pin carriage is in its rest position, and with said voltage source when said pin carriage is away from its rest position, whereby said first switch-over relay is energized by the charge of said condenser when said pin carriage returns to its rest position after said first number has been entered.

13. The combination as claimed in claim 5, further comprising an additional relay adapted to energize said second switch-over relay, and means for connecting said additional relay in series with the operating magnet of the selected function key during the sensing of said second number.

14. The combination as claimed in claim 5, further comprising an additional relay connected in series with the operating magnet of said adding key and adapted to interrupt the circuits of said second switch-over relay and of said sensing contact.

15. The combination as claimed in claim 5, wherein the digit positions of said register are divided in two groups each serving to register one of the said numbers, and wherein said register comprises three function positions serving to register the entering and adding functions.

References Cited in the file of this patent

UNITED STATES PATENTS

| | | |
|---|---|---|
| 2,045,437 | Daly | June 23, 1936 |
| 2,376,234 | De Castro | May 15, 1945 |
| 2,497,784 | Mehan et al. | Feb. 14, 1950 |
| 2,840,807 | Todd | June 24, 1958 |
| 2,842,309 | Erbstosser | July 8, 1958 |
| 2,864,554 | Rolph et al. | Dec. 16, 1958 |
| 2,970,756 | Spesock et al. | Feb. 7, 1961 |